US007380168B2

(12) United States Patent
Raghunandan et al.

(10) Patent No.: US 7,380,168 B2
(45) Date of Patent: May 27, 2008

(54) SYSTEM DEVELOPMENT TOOL

(75) Inventors: Makaram Raghunandan, Northboro, MA (US); Rajendra S. Yavatkar, Portland, OR (US); Shou C. Chen, Portland, OR (US); Dave Edwards, Phoenix, AZ (US); Geoffrey R. Gustafson, Arlington, MA (US)

(73) Assignee: Intel Corporation, Santa Clara, CA (US)

( * ) Notice: Subject to any disclaimer, the term of this patent is extended or adjusted under 35 U.S.C. 154(b) by 511 days.

(21) Appl. No.: 11/171,762

(22) Filed: Jun. 30, 2005

(65) Prior Publication Data

US 2007/0006171 A1    Jan. 4, 2007

(51) Int. Cl.
*G06F 11/00* (2006.01)

(52) U.S. Cl. .................. 714/27; 703/17; 703/21; 717/135

(58) Field of Classification Search .......... 714/27; 703/17, 21; 717/135
See application file for complete search history.

(56) References Cited

U.S. PATENT DOCUMENTS

| 5,805,867 A | * | 9/1998 | Kodaira | .............. 703/21 |
| 6,983,234 B1 | * | 1/2006 | Hangal et al. | .............. 703/14 |
| 2006/0070042 A1 | * | 3/2006 | Muratori et al. | .............. 717/135 |
| 2006/0112397 A1 | * | 5/2006 | Raghunandan et al. | .............. 719/313 |

OTHER PUBLICATIONS

Press Release, "Lauterbach Debugger Delivers Multi-Processor Support for Altera's Nios II Embedded Processor", Mar. 7, 2005, Altera. Retrieved from Internet: URL: http://www.altera.com/corporate/news_room/releases/products/nr-lauterbach.html , 2 pgs.
"An Introduction to the GNU Debugger", 12pgs.
Muratori et al., U.S. Appl. No. 10/949,261 entitled "Automatic Clocking in Shared-Memory Co-Simulation" (filed Sep. 24, 2004).
Skarpness et al., U.S. Appl. No. 10/993,326 entitled "Cross-Architecture Software Development" (filed Nov. 18, 2004).

* cited by examiner

*Primary Examiner*—Christopher S McCarthy
(74) *Attorney, Agent, or Firm*—Buckley, Maschoff & Talwalkar LLC

(57) ABSTRACT

According to some embodiments, execution information is received from a first development tool. Execution information is also received from a second development tool. Based on the first execution information and the second execution information, operation of the first development tool may be controlled. According to some embodiments, the first and second development tools are associated with different processor architectures.

28 Claims, 12 Drawing Sheets

SYSTEM DEVELOPMENT TOOL

BACKGROUND

A processor may execute a software program to perform a function. For example, a processor might execute a software program to examine an information packet, to modify the information packet, and/or to forward the information packet toward a destination. Applications known a "development tools" are widely used by developers who write these and other types of software programs. One purpose of a development tool may be to let a software developer look for errors in a software program that is under development. By way of example, a debugging program might simulate the execution of instructions and effectively "freeze" execution of a program at a given instruction. In this way, a developer can inspect the state of the simulation (e.g., by checking the value of a variable or memory content) to gain insight into the workings of the program under examination.

Some processing systems include multiple processors that execute different software programs. The use of multiple processors may result in significant efficiencies, but conventional development tools do not readily allow for simultaneous debugging of software programs that will execute on different processors.

DETAILED DESCRIPTION

Figure 1:
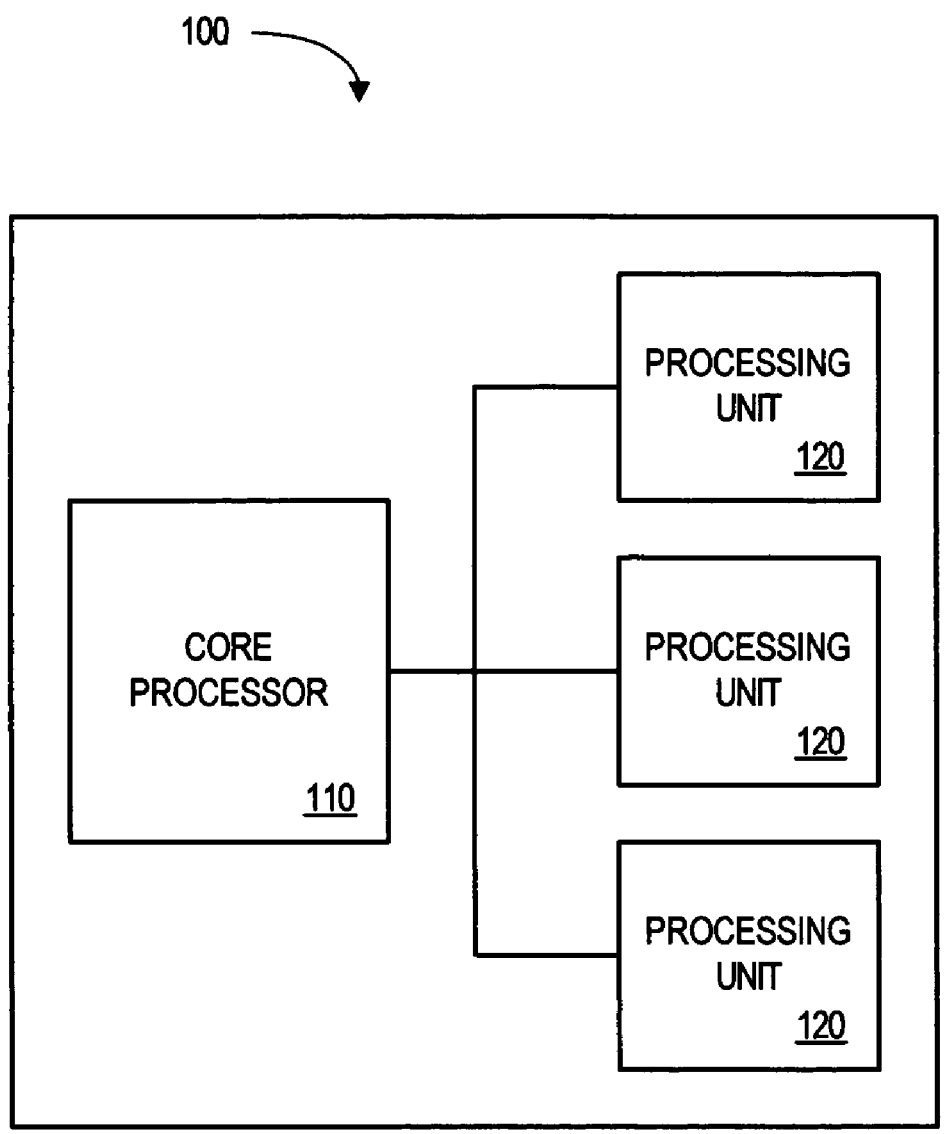
FIG. 1 is a block diagram of a network processor.

FIG. 1 is a block diagram of a network processor 100. As used herein, the phrase "network processor" may refer to, for example, a device that facilitates an exchange of information via a network, such as a Local Area Network (LAN), or a Wide Area Network (WAN). By way of example, the network processor 100 might facilitate an exchange of information packets in accordance with the Fast Ethernet LAN transmission standard 802.3-2002® published by the Institute of Electrical and Electronics Engineers (IEEE). According to some embodiments, the network processor 100 is associated with a switch, a router (e.g., an edge router), a layer 3 forwarder, and/or protocol conversion. The network processor 100 may, for example, facilitate an exchange of information via one or more networks by receiving, processing, and/or transmitting packets of information (e.g., via a media or switch fabric interface not illustrated in FIG. 1). Examples of network processors include those in the INTEL® IXP 2000 family of network processors.

The network processor 100 may include a core processor 110 (e.g., to process the packets in the control plane). The core processor 110 may comprise, for example, a general purpose Central Processing Unit (CPU) able to perform intensive processing on an information packet. By way of example, the core processor 110 may comprise an INTEL® StrongARM core CPU.

The network processor 100 may also include a number of high-speed processing units 120 (e.g., microengines) to process the packets in the data plane. Although three processing units 120 are illustrated in FIG. 1, note that any number of processing units 120 may be provided. Also note that different processing units 120 may be programmed to perform different tasks. By way of example, one processing unit 120 might receive input information packets from a network interface. Another processing unit 120 might process the information packets, while still another one forwards output information packets to a network interface. The processing units 120 might comprise, for example, multi-threaded, Reduced Instruction Set Computer (RISC) microengines adapted to perform information packet processing.

A software program for the core processor 110 and/or a processing unit 120 may be written in, for example, assembly language (e.g., microcode) or a higher-level programming language, such as the C programming language defined by the American National Standards Institute (ANSI)/International Standards Organization (ISO)/International Engineering Consortium (IEC) standard entitled "Programming Languages—C," Document Number 9899 (Dec. 1, 1999) or the INTEL® Network Classification Language (NCL). Software programs written in such higher-level languages may then be compiled into assembly language and executed.

Figure 2:
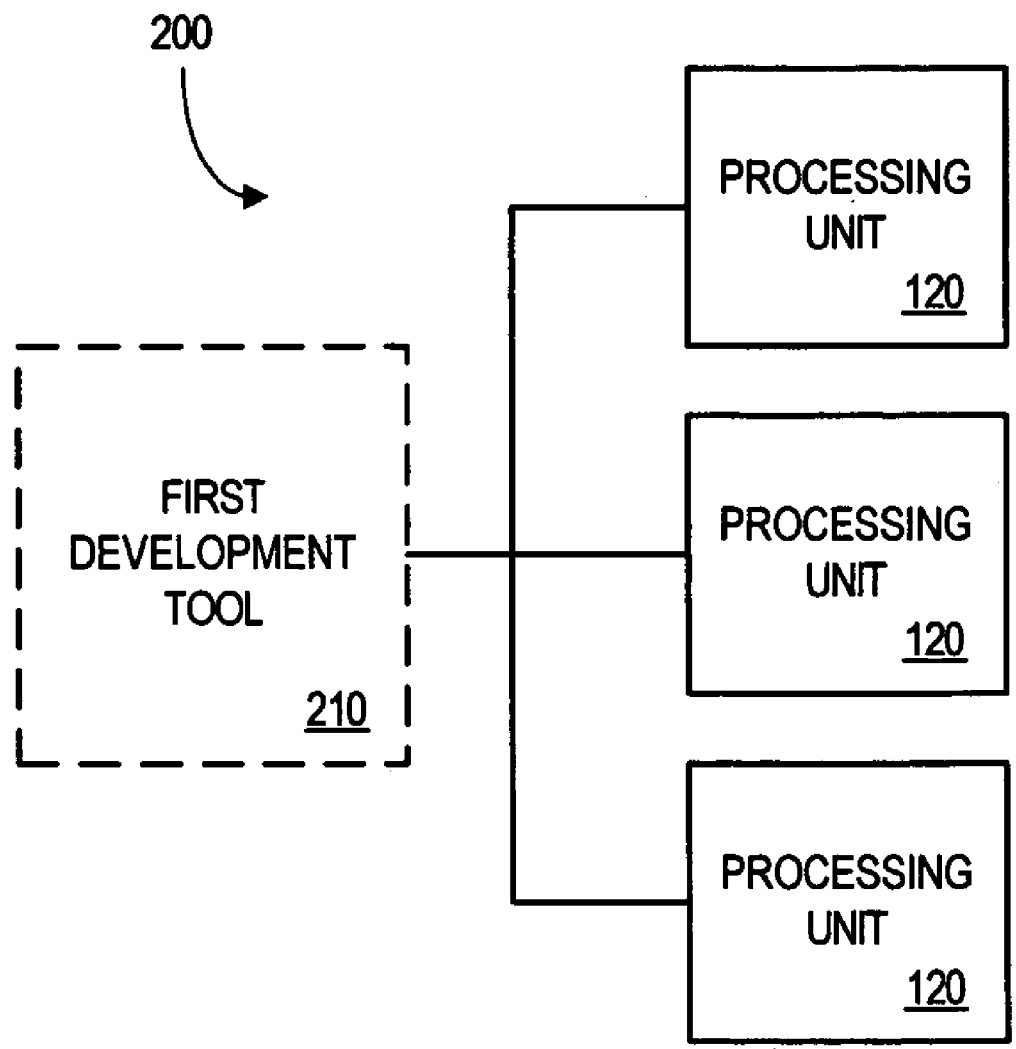
FIG. 2 is a block diagram of a system including a first development tool.

The facilitate development of software programs, code may be executed by a device that simulates the operation of the core processor 110. For example, FIG. 2 illustrates a system 200 including a first development tool 210. The first development tool 210 might, for example, be a debugging application or functional simulator (e.g., not every gate of an actual core processor 110 might be simulated). The first development tool 210 may include a Graphical User Interface (GUI) debugging interface to a let a developer examine the state of the simulated core processor as a series of instructions are executed. Note that as used herein, a development tool might be associated with a simulation and/or an actual hardware unit.

Figure 3:
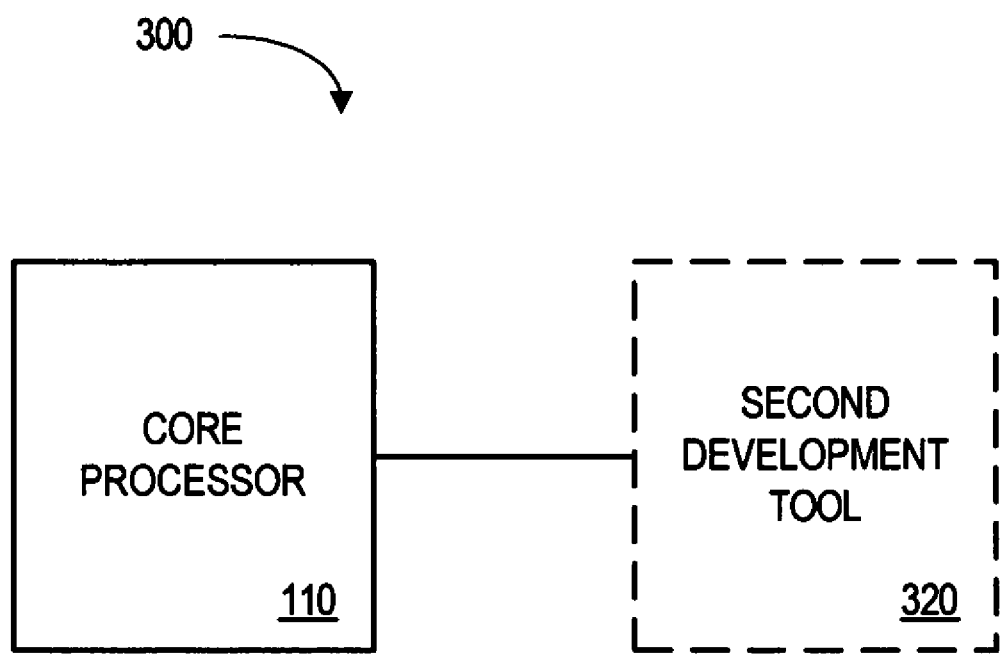
FIG. 3 is a block diagram of a system including a second development tool.

Similarly, FIG. 3 illustrates a system 300 including a second development tool 320. The second development tool 320 might, for example, be a cycle-accurate simulator (e.g., every gate of the an actual processing unit 120 might be simulated). The second development tool 320 might also include a GUI debugging interface (e.g., a developer workbench).

In some cases, however, it may be desirable to cooperatively debug software programs for both the core processor 110 and a processing unit 120 at substantially the same time. This might be the case, for example, when interactions between the core processor 110 and a processing unit 120 are being examined.

Figure 4:
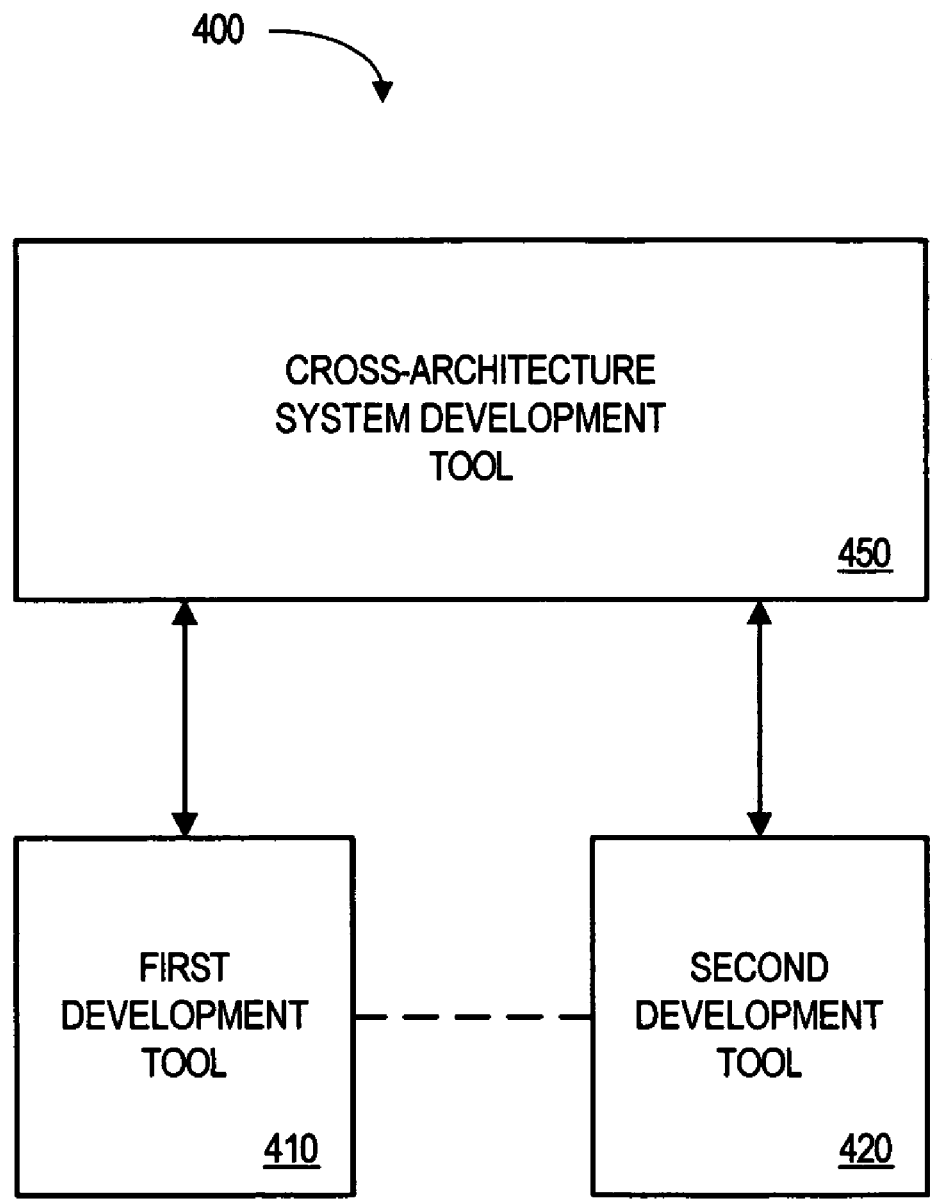
FIG. 4 is a block diagram of a system including both a first and second development tool.

FIG. 4 illustrates a system 400 including both a first development tool 410 and a second development tool 420 according to some embodiments. The system 400 further includes a cross-architecture development tool 450 that exchanges information with both the first development tool 410 and the second development tool 420. The cross-architecture development tool 450 may, for example, communicate with the tools 410, 420 via a communication network. According to some embodiments, the first development tool 410, the second development tool 420, and the cross-architecture development tool 450 are co-located (e.g., they may represent different components executing at a single device). Although two development tools 410, 420 are illustrated in FIG. 4, note that a cross-architecture development tool 450 could be associated with more than two other tools.

Figure 5:
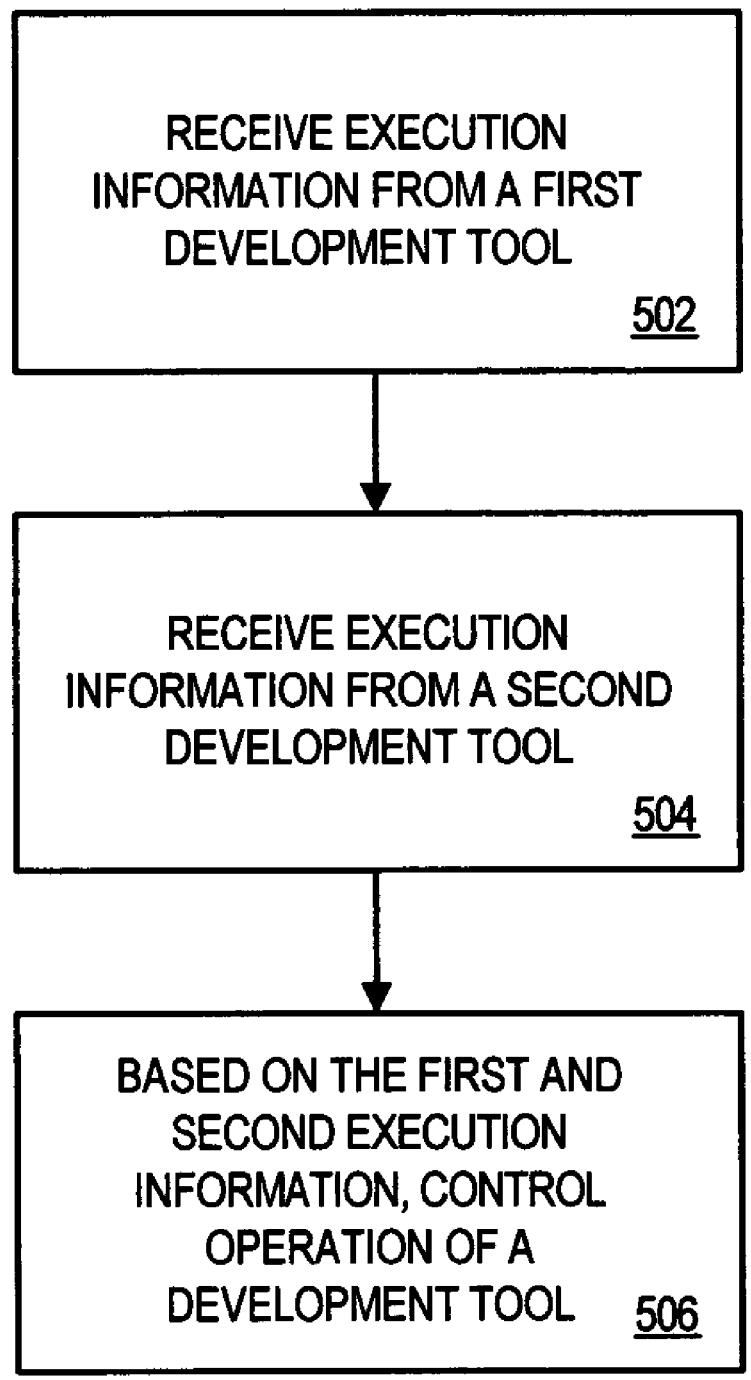
FIG. 5 is a flow diagram illustrating a method according to some embodiments.

The cross-architecture development tool 450 may let a system designer or debugger access and/or use both the first development tool 410 and the second development tool 420. For example, FIG. 5 is a flow diagram illustrating a method according to some embodiments. The flow chart may be associated with, for example, the cross-architecture system development tool 450 of FIG. 4. The flow charts described herein do not necessarily imply a fixed order to the actions, and embodiments may be performed in any order that is practicable. Note that any of the methods described herein may be performed by hardware, software (including microcode), or a combination of hardware and software. For example, a storage medium may store thereon instructions that when executed by a machine results in performance according to any of the embodiments described herein.

At 502, execution information is received from a first development tool associated with a first processor architecture. Similarly, execution information is received from a second development tool, associated with a second processor architecture, at 504. The execution information might comprise, for example, an indication that an event has occurred and/or that a condition is satisfied.

At 506, operation of a development tool is controlled based on the first execution information and the second execution information. For example, one or more development tools might be halted to let a system designer or debugger examine the state of a simulation.

Figure 6:
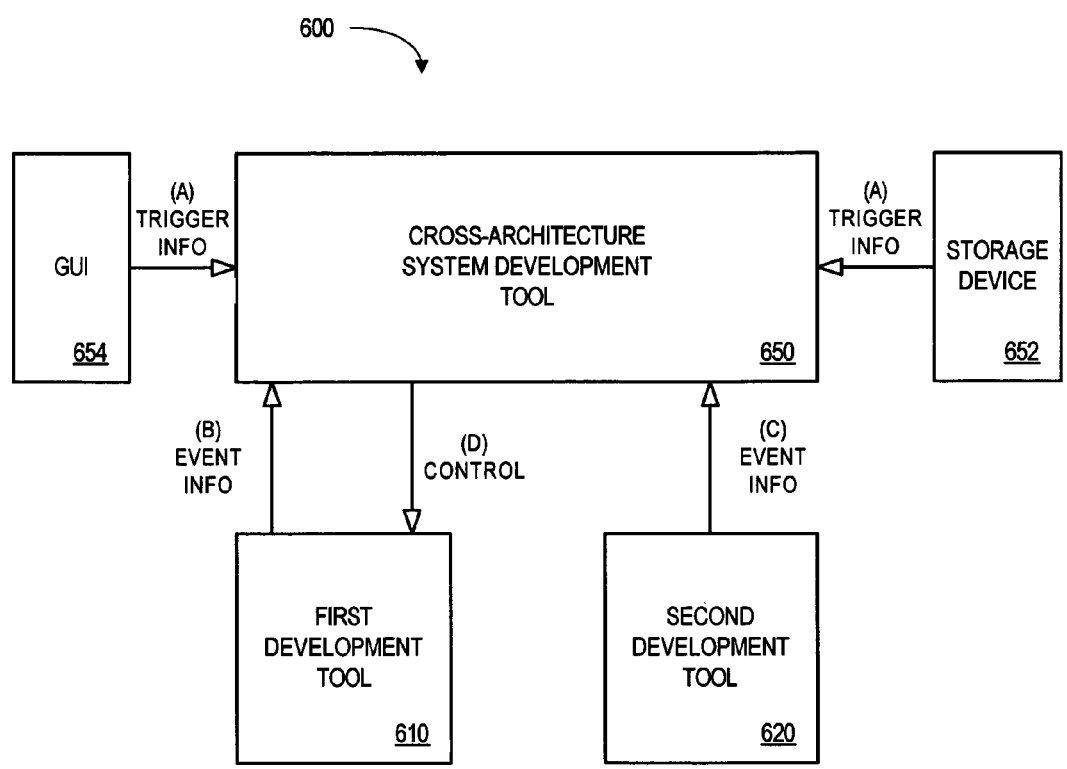
FIG. 6 is an information flow diagram according to some embodiments.

FIG. 6 is an information flow diagram 600 according to some embodiments. In particular, a cross-architecture system development tool 650 exchanges information with a first development tool 610 and a second development tool 620. At (A), the cross-architecture system development tool 650 may retrieve pre-defined trigger information from a storage device 652.

Figure 7:
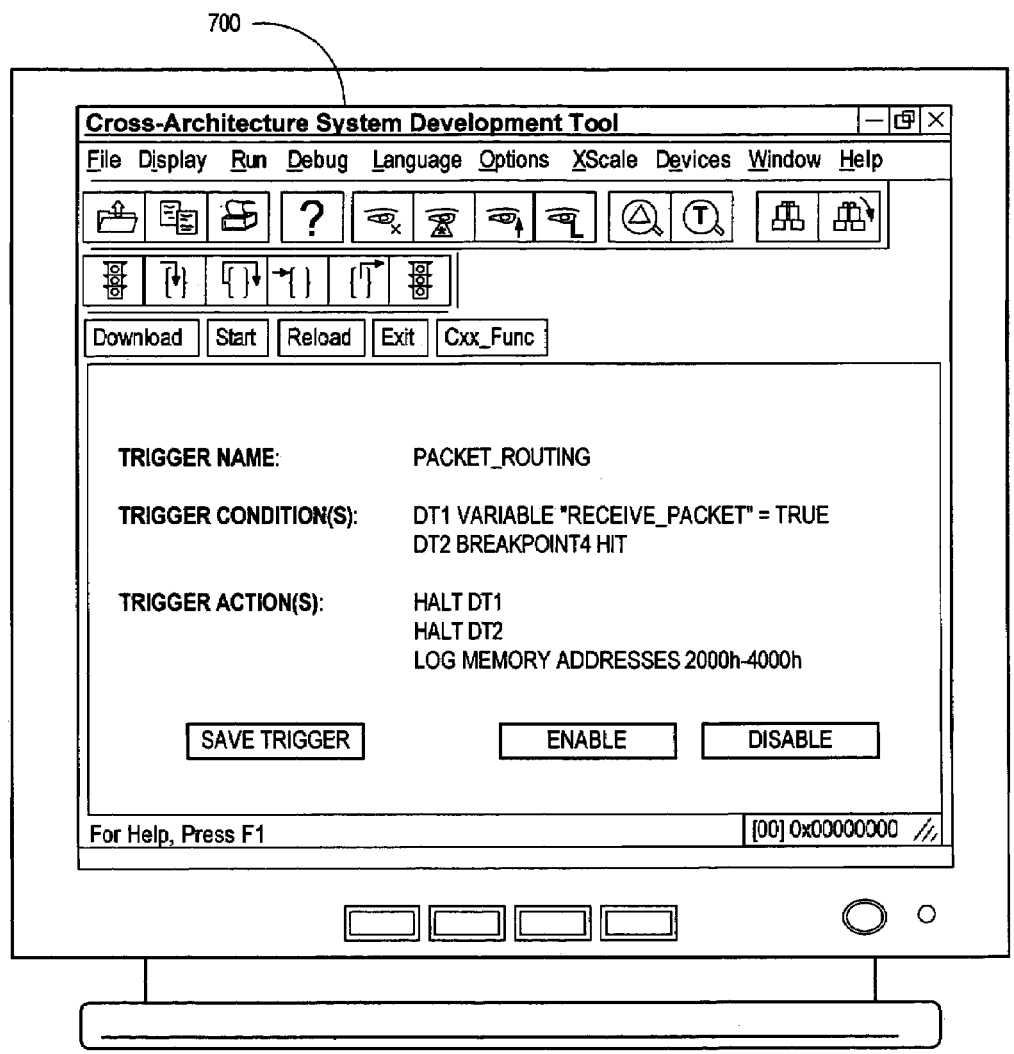
FIG. 7 illustrates a display according to some embodiments.

According to some embodiments, a Graphical User Interface (GUI) may provide trigger information to the cross-architecture system development tool 650 at (A). For example, a user might define, enable, or disable a trigger via a GUI display such as the display 700 illustrated in FIG. 7. The display 700 might comprise, for example, a user interface common to a number of development tools that enables communications between a debugger and the development tools.

The trigger information might include a trigger name, one or more trigger conditions associated with multiple development tools (e.g., development tool 1 and development tool 2), and/or at least one trigger action (e.g., to be performed when the trigger conditions are satisfied). According to some embodiments, a trigger may comprise a combination of events (e.g., reported by a development tool) and/or other triggers.

Referring again to FIG. 6, at (B) the cross-architecture system development tool 650 receives event information from the first development tool 610. Similarly, at (C) the cross-architecture system development tool 650 receives event information from the second development tool 620. The event information might, for example, indicate that a condition is true (or false).

Note that information about different types of events might be transmitted from a development tool 610, 620 to the cross-architecture system development tool 650. According to some embodiments, a message is transmitted to the cross-architecture system development tool 650 including an identifier indicating which type of event has occurred.

One type of event might indicate that a breakpoint has been encountered by one of the development tools 610, 620. According to some embodiments, one or more conditions may be associated with the breakpoint (e.g., a breakpoint might only be reported when a particular variable has a particular value when the breakpoint is encountered). As another example, an event might be associated with a data value. For example, an event might be reported indicating that a simulated register contains a particular value or that a memory location value has changed. Other examples of events might include an indication that a packet has been generated or received, that an error has occurred in a simulation (e.g., a divide by zero operation), and/or that an error has occurred in a debugging system (e.g., a development tool 610, 620 is having trouble communicating with the cross-architecture system development tool 650).

At (D), the cross-architecture system development tool 650 transmits one or more signals to control the first development tool 610. For example, the cross-architecture system development tool 650 might determine (based, on event information received from the development tools 610, 620) that a set of trigger conditions have been satisfied and, and a result, transmit a signal indicating that the first development tool 610 should stop executing instructions. According to some embodiments, the cross-architecture system development tool 650 might instead transmit a signal indicating that a development tool 610, 620 should resume the execution of instructions.

As still another example, the cross-architecture system development tool 650 might define one or more events that the should be reported by a development tool 610, 620 (or disable an event that was previously defined). According to some embodiments, the cross-architecture system development tool 650 may indicate that a latched event should be cleared or that a development tool 610, 620 should begin (or end) a data capture or logging process.

Note that trigger conditions and associated actions may, according to some embodiments, be used to implement various types of advanced system level debugging features. For example, a breakpoint might be a regular breakpoint associated with a development tool (e.g., the development tool that encounters the breakpoint will itself stop executing instructions). According to some embodiments, a cross-architecture system design tool will let other development tools continue to run when the breakpoint is reported. According to other embodiments, the cross-architecture system design tool might force all other development tools to also stop executing instructions when one tool encounters a breakpoint. As other examples, the cross-architecture system design tool might cause a subset of other development tools to stop, to execute a logging procedure, and/or to execute a user-defined script.

According to some embodiments, a breakpoint may be associated with multiple development tools. For example, a trigger might be defined such that an action will be performed when a first development tool encounters line XXX of its code and a second development tool encounters line YYYY of its code. When the first development tool encounters line XXXX, it may report that event to the cross-architecture system design tool, which may latch that the one of the two conditions has occurred. When the second development tool subsequently reports that it has encountered line YYYY, the cross-architecture system design tool may then initiate the appropriate action (e.g., both development tools might be halted).

Consider, for example, a system in which development tools are communicating, reading, and writing messages. In some situation, a message gets lost causing both development tools to lock-up (e.g., they both may be waiting forever). In this situation, a combined breakpoint could be set on the first development tool's WaitForMessage( ) call and the second development tool's WaitForMessage( ) call. When the combined breakpoint is hit, both development tools may be halted right at the moment when the deadlock begins (and a system debugger might be able to figure out the cause of the problem).

In some cases, a time window may be provided for the breakpoints (e.g., an action might only be triggered if a first development tool encounters a breakpoint within 500 millisecond of when a second development tool encountered an associated breakpoint). According to some embodiment a time window may be frozen (e.g., when a user halts execution to examine a memory location).

According to some embodiments, conditional breakpoints may be provided. That is, the cross-architecture system design tool might evaluate an expression when a conditional breakpoint is reported. If the expression is true, a development tool may be stopped (if the condition is not true, the development tool may continue to execute instructions). For example, a conditional breakpoint might cause a development tool to halt only when variable PACKET_PROCESS_COMPLETE equals "true." Note that the expression might be associated with a different development tool.

According to some embodiments, a cross-architecture system design tool might support watchpoints. A watchpoint might comprise, for example, an event that is reported whenever a particular expression changes. As with breakpoints, a watchpoint expression might evaluate information associated with multiple development tools. Moreover, conditional watchpoints may be provided (e.g., the trigger might only be satisfied if the expression has changed and another condition is also satisfied).

Similarly, tracepoints may be supported such that a development tool encounters a tracepoint, performs a specified action, and then resumes the execution of instructions. As before, the cross-architecture system design tool might support tracepoints associated with multiple development tools and/or conditional tracepoints (e.g., multiple development tools might begin logging information when one development tool hits a tracepoint).

According to some embodiments, a catchpoint or "break on exception" may be supporting in connection with multiple development tools. A catchpoint might, for example, be reported as a result of receiving a Unix signal, encountering a C++ exception, reaching a process fork, or a shared library being loaded/unloaded. The cross-architecture system design tool might, for example, support conditional catchpoints wherein the conditions are associated with multiple development tools.

In some cases, the cross-architecture system design tool might provide ordered breakpoints. For example, a trigger action might only be performed when a first development tool encounters a breakpoint after a second development tool encounters an associated breakpoint (but not when the first development tool encounters the breakpoint before the second development tool encountered the associated breakpoint). By way of example, ordered breakpoints might be used when trying to track packet forwarding after a related connection table is updated. In this case, a debugger might set an ordered breakpoint at "packet forwarding code" in a network processor after the "table update code" has executed in a control processor.

Figure 8:
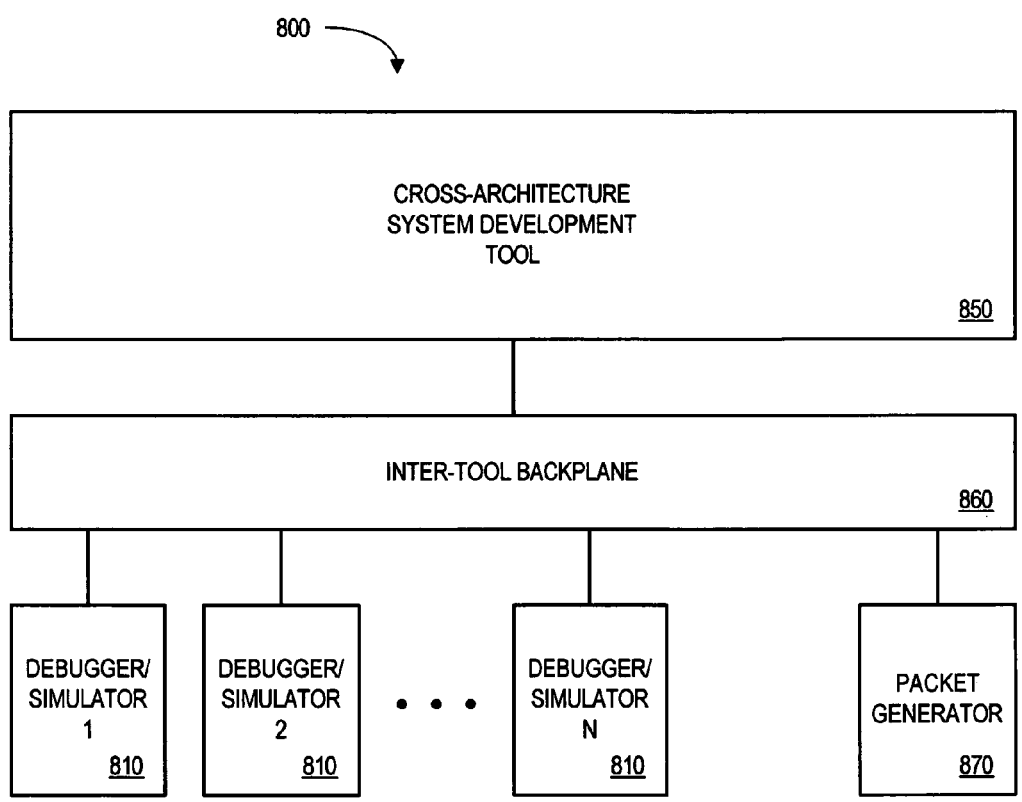
FIG. 8 is an example of a debugging system according to one embodiment.

FIG. 8 is an example of a debugging system according to one embodiment. In this case cross-architecture system design tool 850 may communicate with N debugger/simulators 810 via an inter-tool (or software) backplane 860. The term "inter-tool backplane" may refer to a set of features and functions that act as the backbone for cross-architecture inter-tool interaction. The inter-tool backplane 860 may, for example, include a number of communication ports and communicate using Application Programming Interfaces (APIs).

According to some embodiments, the inter-tool backplane 860 may provides the "glue" to connect the individual development tools sets and system tools to each other and to the cross-architecture system design tool 850. The tools sets (e.g., debugger/simulators 810) may be targeted at N individual chips used on a target system. Each chip may comprise, for example, a silicon component that contains a different processing architecture (or in some cases, multiple processing architectures) or is a device requiring special tools support. In one example target system that includes four different silicon components, and using the architectures and devices mentioned above for illustrative purposes only, chip 1 could be an IA processor, chip 2 could be an IXC processor, chip 3 could be an IXP network processor and chip 'N' (chip 4 in this example) could be some other device, such as an IXF framer or IXE switching engine. Each tools set may encompass a wide variety of individual tools such as simulators, compilers, assemblers, linkers, code generators, debuggers, packet generators and the like.

A user interface may provide a common user interface through which system-level user interactions can occur. It provides system-level capabilities for block diagram creation, project management, build management and debug, and system-level views to support these capabilities; project views and a common GUI to provide a common "look and feel" for all of the system-level tools. A command line interface may be included as part of the user interface as well. In addition, individual tools may have customized graphical views that are appropriate for their specific functions. The user interface 38 also contains common components, for example, a code editor, used by multiple tools. The user interface may be implemented with a common user interface framework such as Eclipse. Eclipse is a Java-based (multi-platform), open source development environment.

Note that many different types of development tools may be supported by the cross-architecture system design tool 850. For each type of tool categories, the cross-architecture system design tool 850 may provide system-level capabilities that encompass the underlying processing architectures. These system-level capabilities are provided either by combining information from underlying tools, or by creating a tool that is common across different processing architectures. The inter-tool backplane 860 provides the services these tools categories need to provide system-level solutions to the user (e.g., ordered breakpoints).

The functional categories of tools might include build tools, simulators, traffic generators, performance analysis tools, debuggers, back-end tools and/or hardware tools. The build tools are tools used to generate the executable code for the target architecture. Tools such as assemblers and compilers belong in this category. There may be other tools such as automatic code generators and graphical design assistants that could also be part of this group of tools. The simulators are architectural or cycle accurate models of the silicon which can be used to perform software test and validation before the availability of target boards or target silicon. Traffic generators are a class of tools specific to networking applications and can be used to generate a rich set of inputs to aid in testing of the system and software. The performance analysis and tuning tools include tools which are used for feasibility analysis at the evaluation/design stage, and tools which are used for performance tuning of the code on target hardware. The debuggers are used to assist in the debug of the code via source level debugging capabilities. The back-end tools include tools used to assist in project planning and management, including tools for configuration management, defect tracking and release engineering. The hardware tools are tools that are used to debug target hardware. Other types of tools may be supported as well.

Note that some or all of these functional tool categories include system-level tools common to all processing architectures. Other tools in a given tool category may be specific to a particular architecture.

The inter-tool backplane 860 may provide mechanisms needed for inter-tool cross-architecture interactions. These interactions can be accomplished by means of a run-time subsystem or interaction broker, APIs exposed to the system level and architecture, specific tools, configuration files, common data exchange formats and/or a tools registry.

The tools in an integrated environment interact with each other and the inter-tool backplane 860 in various ways. These interactions occur because of some shared state, shared hardware components and inter-dependency. The inter-tool interactions use functionality provided by the inter-tool backplane 860. In particular, the inter-tool backplane 860 enables interactions between tools of different tools, that is, cross-architecture interactions. Different components of a tool may not use the inter-tool backplane for the communication. Instead, they may use interactions specific to those tools. Also, the interactions across different tools of a given tools set are specific to that tools set and may not involve the inter-tool backplane 860.

According to some embodiments, a system packet generator 870 provides packet data as input for simulation and validates the simulated output. The packet generator 870 may interact with different individual simulators through the inter-tool backplane 850.

Figure 9:
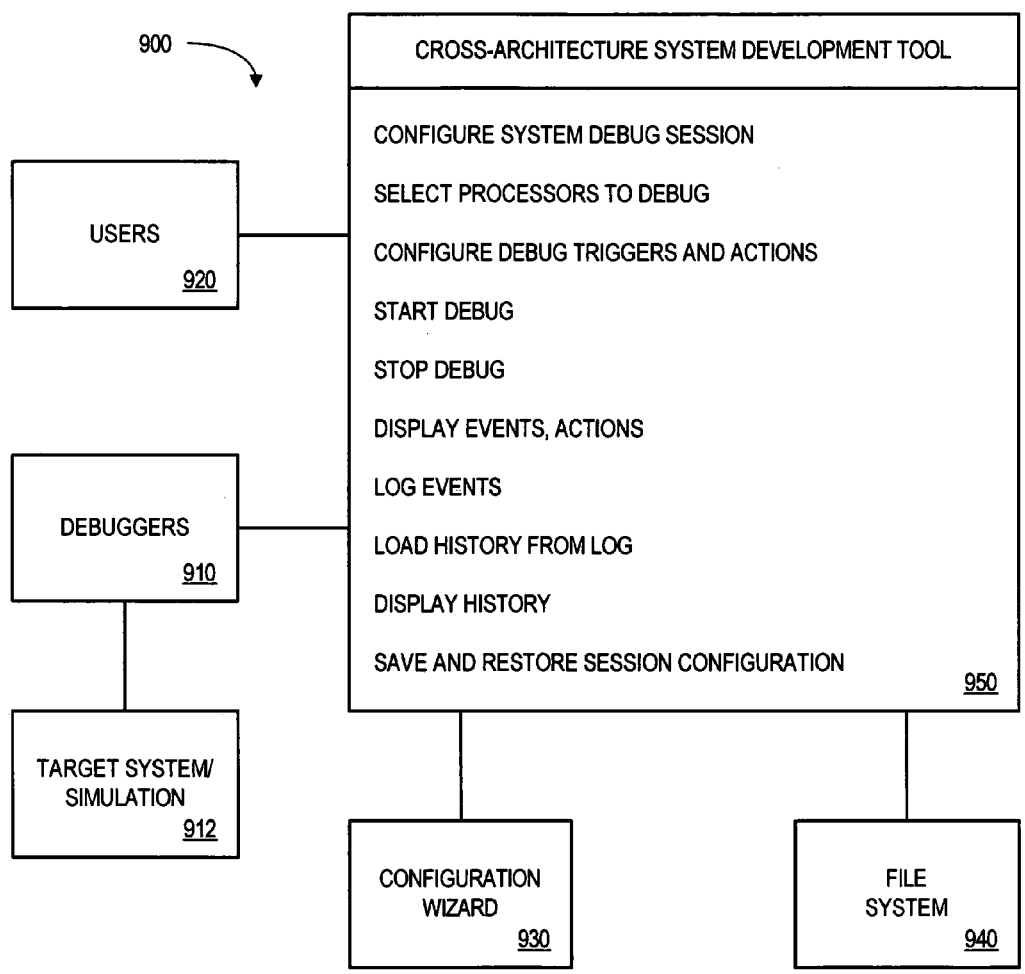
FIG. 9 is a use case model for a cross-architecture system development tool according to some embodiments.

FIG. 9 is a use case model 900 for a cross-architecture system development tool 950 according to some embodiments. In particular, users 920 may interact with the cross-architecture system development tool 950 to configure a debugging session and/or to initiate system level debugging. According to some embodiments, users 950 will be able to configure the necessary settings such as the target connection method (UART, or network ID) for each of the individual debuggers. In some cases, there may be complex configurations (e.g., requiring information about which firmware to use). According to some embodiments, a configuration wizard 930 may be provided to facilitate the configuration. Based on the user settings, the cross-architecture system development tool 950 may launch the individual debuggers 910 for each of the required processing architectures (and associated target systems/simulations 912).

The users 920 may interact with individual debuggers 910 to setup events such as breakpoints and data watches. According to some embodiments, the cross-architecture system development tool 950 (and/or individual debuggers 910) can save these event setups (on a per project basis) across multiple debugging sessions via a file system 940. The cross-architecture system development tool 950 may also gather these events that have been configured in individual debuggers 910 and present a system wide view to users 920. The users 920 may generate trigger configurations using Boolean and/or arithmetic expressions on data watch variables (e.g., the sum of variables from different types of processors). The users 920 may also specify actions based on these triggers. The actions may include generating other debug events or triggers, initiating or terminating logging and stopping/starting one or more targets 912. A logging feature may let users 920 capture event and action traces and save them to file(s). The cross-architecture system development tool 950 may also be used to view these saved log files.

Figure 10:
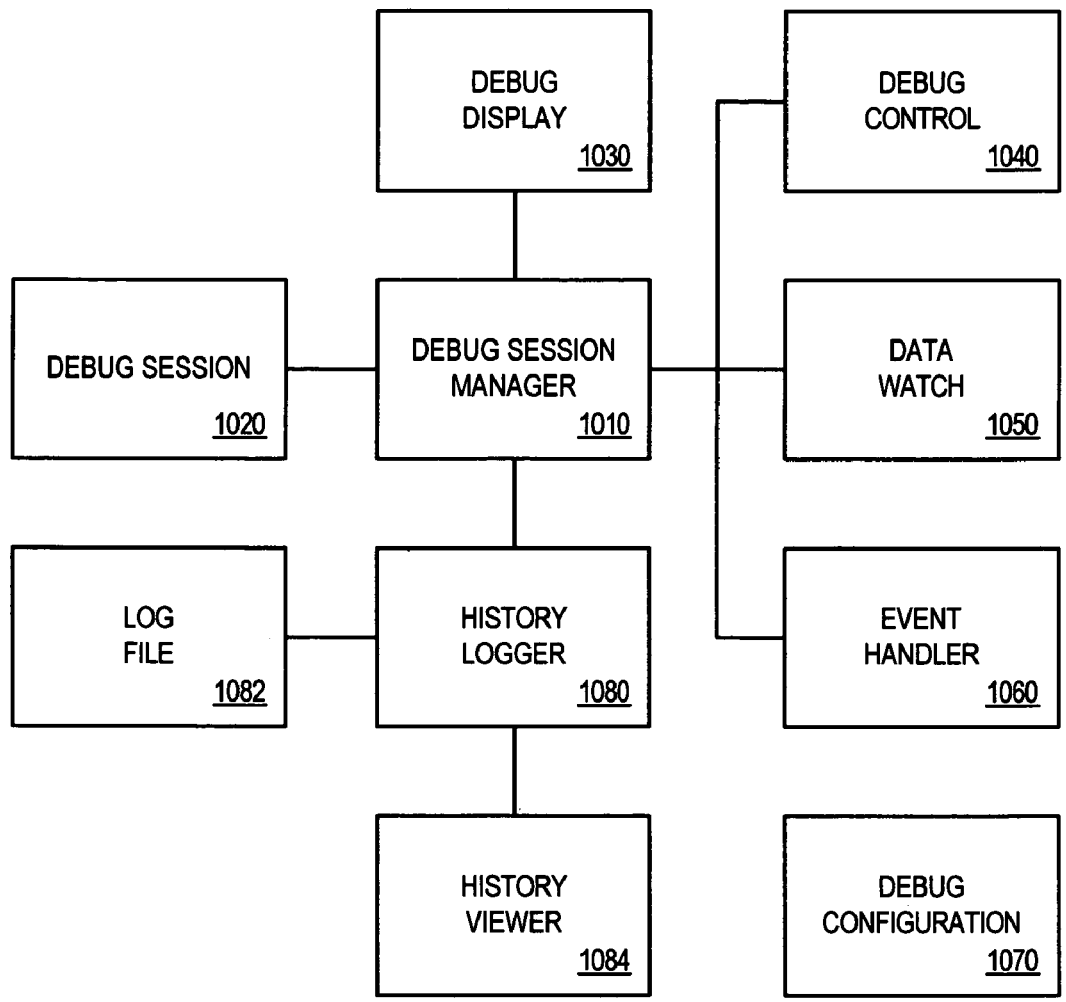
FIG. 10 is an internal structure of a cross-architecture system development tool according to some embodiments.

FIG. 10 is an internal structure of a cross-architecture system development tool according to some embodiments. A debug session manager subsystem 1010 may manage actual connections with individual debuggers. The debug session manager subsystem 1010 may act as a primary interface to gathering event transition information and for sending actions to the individual debuggers. At startup time, the debug session manager subsystem 1010 will gather the configured events for individual debuggers (e.g., in accordance with debug configuration information 1070) and provides this information to a debug control subsystem 1040 to establish a debug session 1020. The debug control subsystem 1040 will send session control information needed by the debug session manager 1010. The debug session manager 1010 may send event information to an event handler 1060 and gather the generated actions from the event handler 1060. Further, the debug session manager 1010 may send session updates to a debug display subsystem 1030 for display in a user interface. The debug session manager 1010 may also be configured to send some extra debug session information to a history logger 1080 as well (e.g., to be stored in a log file 1082 and/or be accessed by a history viewer 1084).

Note that different underlying debuggers may have variations in response time for gathering data and responding to actions. This difference in response time may be caused, for example, by the differences in internal implementation of the underlying debuggers and by the differences in connection methods that are used to connect to target hardware (such as an Ethernet or a serial interface). Further, we may choose to gather data from different debuggers at different times and/or rates. The combination of these two factors (response time and data gathering points) might lead to issues such as head-of-line blocking or may require more elaborate scheduling schemes. According to some embodiments, a separate thread of execution of the debug session manager 1010 may be provided for each processor specific debug session.

The debug display subsystem 1030 might comprise a main user interface for the cross-architecture system development tool. The selected events, triggers, and actions might be displayed via the debug display 1030. In addition, the debug display 1030 might provide session status information (e.g., "connected" or "running") along with session specific logging information (e.g., console logs and errors).

The debug control subsystem 1040 might control the debug session 1020, start and stop debug session 1020, and/or maintain debug configuration information 1070. The debug control subsystem 1040 may also maintain event lists, and update the debug display 1030 with event related information. The debug control subsystem might, for example, allow a configuration or state to be saved into a file and restored at a later session on a per project basis. The debug control subsystem 1040 may also interact with the user (through the debug display 1030) to generate trigger and action configurations. These configurations may, for example, then be passed to the event handler 1060.

The event handler subsystem 1060 may gather event transition information from the debug session manger 1010 and the configuration information from debug control 1040. The event handler subsystem 1060 may compute trigger based on event and generate needed actions. The debug actions are sent to debug session manger 1010 for transmittal to the target debugger. Logging events will be sent to the history logger subsystem 1080. The event handler 1060 may also send event, trigger, and/or action updates to debug control 1040 for display in the debug display 1030.

Figure 11:
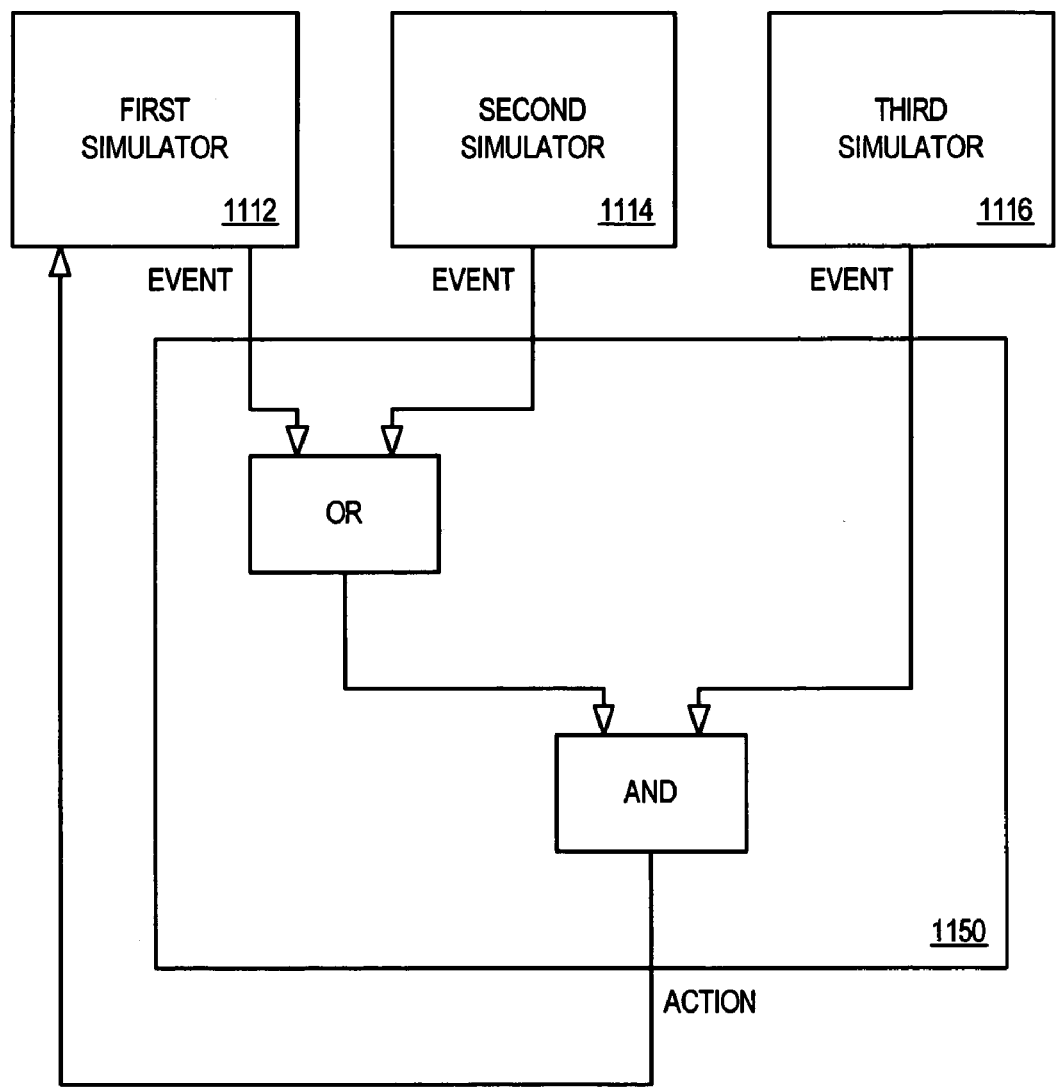
FIG. 11 illustrates Boolean operands for a trigger condition according to some embodiments.

FIG. 11 illustrates Boolean operands for a trigger condition according to some embodiments. In particular, a trigger has been established such that an action will be performed when (a particular event is received from a first simulator 1112 OR a particular event is received from a second simulator 114) AND another event is received from a third simulator 1116. These conditions might be evaluated, for example, at a remote cross-architecture system development tool 1150. The events might be associated with, for example, breakpoints or variable values. Note that in this example, the action is performed by transmitting a message to the first simulator 1112 (e.g., indicating that the first simulator 1112 should stop executing instructions).

Note that there may be delay incurred between the time that debug events are sent to the cross-architecture system development tool 1150, the trigger conditions are evaluated by the cross-architecture system development tool 1150, and debug action is sent to the first simulator 1112. The delay may be undesirable if the action should occur as soon as possible (once the trigger conditions are met).

Figure 12:
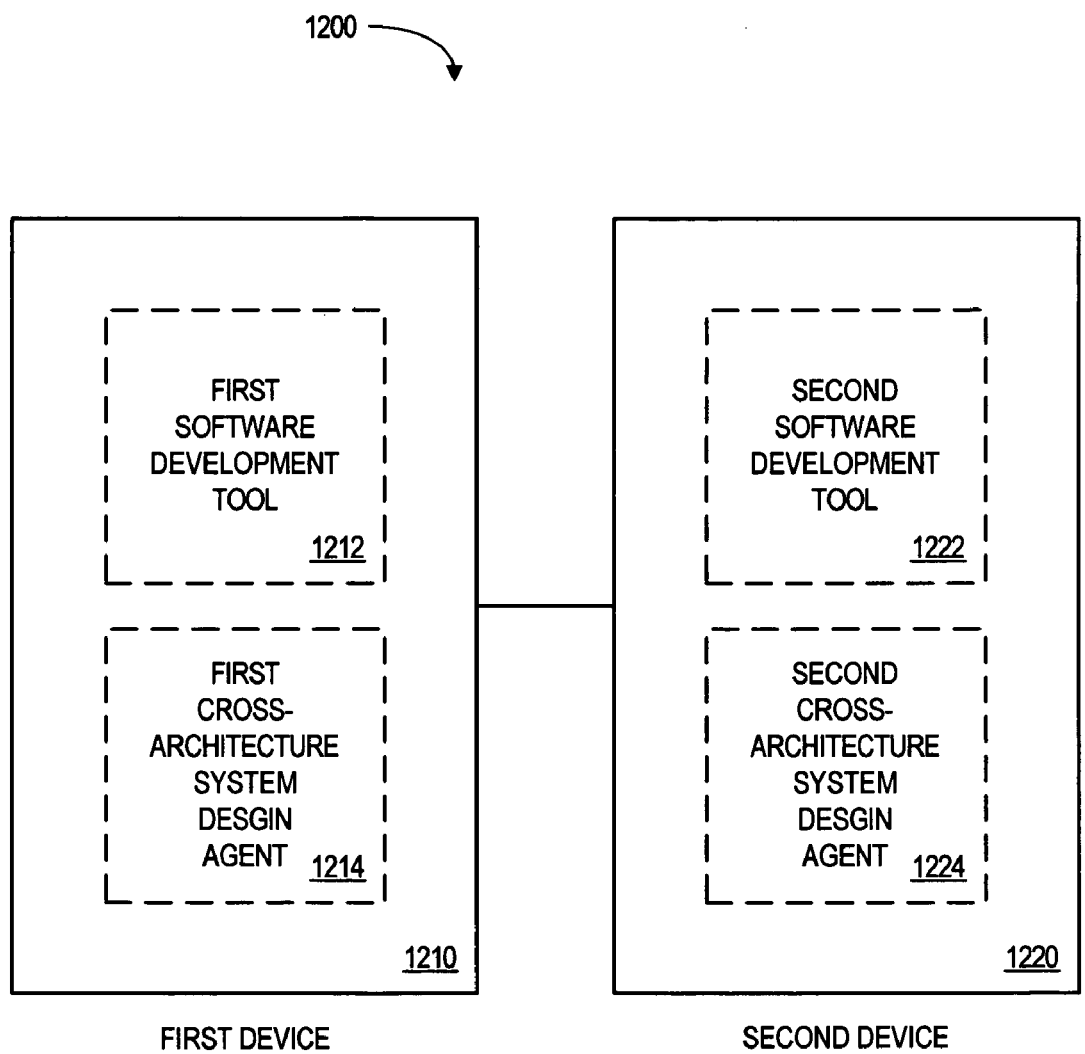
FIG. 12 is a block diagram of a distributed cross-architecture system development tool according to some embodiments.

According to some embodiments, such a delay may be reduced by having a local cross-architecture system development tool agent at (or near) one or more of the simulators 1112, 1114, 1116. For example, FIG. 12 is a block diagram of a system 1200 according to some embodiments. In this case, a first device 1210 hosts a first software development tool 1212 along with a first cross-architecture system design agent 1214. Similarly, a second device 1220 hosts a second software development tool 1222 along with a second cross-architecture system design agent 1224. The cross-architecture system design agents 1214, 1224 might be established and updated, for example, by a cross-architecture system design manager (not illustrated in FIG. 12).

Consider, for example, a user who would like information logged when a breakpoint is reached by the first software development tool 1212 AND the value of READ_PACKET at the second software development tool 1222 equals "waiting." In this case, when the value of READ_PACKET at the second software development tool transitions to "waiting," the first cross-architecture system design agent 1214 might be informed. As a result, as soon as the breakpoint is reached by the first software development tool 1212 is encountered, the first cross-architecture system design agent 1214 can immediately instruct the first software development tool 1212 to begin logging the information (e.g., without having to pass the information through a central cross-architecture system design agent).

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Although some examples have been described with respect to a network processor, embodiments may be used in connection with any type of processing system. Moreover, although software or hardware have been described as performing various functions, such functions might be performed by either software or hardware (or a combination of software and hardware).

Moreover, although some embodiments are described with respect to different processor architectures, note that any embodiment might be associated with different operating systems, different programming languages (e.g., Java and C++), and/or different cores. For example, embodiments might be associated with a dual core Intel Architecture (IA) processor, a 4-way IA processor board, or multiple IA blades in a chassis.

In addition, embodiments could be associated with a single software development tool. That is, a controller might receive first and second event information from a development tool. The controller may then control the operation of the development tool based on, for example, a trigger condition. For example, a controller might stop the development tool from executing if the program executes line 2000 after having previously executed line 1000 within the last two seconds.

The several embodiments described herein are solely for the purpose of illustration. Persons skilled in the art will recognize from this description other embodiments may be practiced with modifications and alterations limited only by the claims.

What is claimed is:

1. A method, comprising:
receiving first execution information from a first development tool;
receiving second execution information from a second development tool; and
based on the first execution information and the second execution information, stopping the first development tool and notifying a user.

2. The method of claim 1, wherein the first and second development tools are associated with at least one of: (i) different processor architectures, (ii) different operating systems, (iii) different programming languages, or (iv) different cores of a processor architecture.

3. The method of claim 1, wherein the execution information is received from more than two development tools.

4. The method of claim 1, wherein the execution information comprises event information.

5. The method of claim 4, wherein the event information is associated with at least one of: (i) a variable name, (ii) a physical register, (iii) a memory location, (iv) an instruction, (v) a breakpoint, (vi) a combined breakpoint, (vii) a conditional breakpoint, (viii) a timed breakpoint, (ix) an ordered breakpoint, (x) a data watch, (xi) a watchpoint, (xii) a multiprocessor watchpoint, (xiii) a tracepoint, (xix) a multiprocessor tracepoint, (xx) a catchpoint, (xxi) a multiprocessor catchpoint, (xxii) a packet, (xxiii) a target error, or (xxiv) a debug error.

6. The method of claim 1, further comprising:
receiving trigger information from a user interface, including conditions associated with the first execution information and the second execution information.

7. The method of claim 6, wherein the conditions are associated with at least one Boolean operation.

8. The method of claim 6, wherein the conditions are associated with at least one arithmetic operation.

9. The method of claim 6, wherein the trigger information further includes an action to be performed when the conditions are satisfied.

10. The method of claim 9, wherein the action comprises at least one of: (i) stopping another development tool, (ii) continuing a third development tool, (iii) enabling another event, (iv) disabling an event, (v) clearing an event, (vi) capturing data, (vii) logging, (viii) debugging, or (ix) clearing a trigger.

11. The method of claim 1, wherein said stopping is performed by a cross-architecture development tool agent associated with one of the first and second development tools.

12. The method of claim 1, wherein the first and second development tools are associated with a network processor.

13. The method of claim 12, wherein the network processor is associated with at least one of: (i) Internet protocol information packets, (ii) Ethernet information packets, (iii) a local area network, (iv) a wide area network, (v) a switch, or (vi) a router.

14. An article comprising:
a computer-readable storage medium having stored thereon instructions that when executed by a machine result in the following:
receiving an indication of a first debugging event from a first debugging tool associated with a first processor;
receiving an indication of a second debugging event from a second debugging tool associated with a second processor;
evaluating a trigger condition in accordance with the first and second debugging events; and
based on said evaluating, stopping the first development tool and notifying a user.

15. The article of claim 14, wherein execution of said instructions further results in:
providing a user interface common to the first and second development tools; and
enabling communications between the user interface and the development tools.

16. The article of claim 14, wherein execution of said instructions further results in:
maintaining configuration parameters and metadata for the first and second development tools.

17. An apparatus, comprising:
a first communication port to communicate with a first development tool associated with a first processor;
a second communication port to communicate with a second development tool associated with a second processor; and
a user interface to receive a trigger condition and to perform an associated action, wherein the trigger condition depends upon information to be received from both the first development tool and the second development tool and further wherein the associated action includes (i) stopping the first development tool and (ii) notifying a user.

18. The apparatus of claim 17, wherein the apparatus comprises a cross-architecture system development tool, and further comprising:
an backplane to couple the system development tool with the first and second development tools.

19. The apparatus of claim 18, wherein at least one of the first and second development tools comprises at least one of: (i) a debugger, or (ii) a simulator.

20. The apparatus of claim 18, wherein the inter-tool backplane comprises application programming interfaces with to the development tools.

21. A system, comprising:
a plurality of development tools, different ones of the development tools being dedicated to different processor architectures;
a cross-architecture system development tool to receive event information from at least two of the development tools and further to stop one of the development tools and notify a user based on the received event information and a trigger condition; and
a graphical user interface to exchange information associated with at least one of event information or the trigger condition.

22. The system of claim 21, wherein the different processing architectures include a general purpose processing architecture and a network processor architecture.

23. The system of claim 21, wherein at least one of a configuration or a state of the cross-architecture system development tool may be stored.

24. A method, comprising:
receiving execution information from a first development tool;
receiving execution information from a second development tool;
receiving trigger information from a user interface, including conditions associated with the first execution information and the second execution information; and
based on the first execution information, the second execution information, and the received trigger information controlling operation of the first development tool.

25. The method of claim 24, wherein the conditions are associated with at least one Boolean operation.

26. The method of claim 24, wherein the conditions are associated with at least one arithmetic operation.

27. The method of claim 24, wherein the trigger information farther includes an action to be performed when the conditions are satisfied.

28. The method of claim 27, wherein the action comprises at least one of: (i) stopping a development tool, (ii) continuing a third development tool, (iii) enabling another event, (iv) disabling an event, (v) clearing an event, (vi) capturing data, (vii) logging, (viii) debugging, or (ix) clearing a trigger.

* * * * *